Patented Apr. 18, 1944

2,347,103

UNITED STATES PATENT OFFICE 2,347,103

POLYSTYRENE COMPOSITION

Ralph F. Hayes, North Wilbraham, Mass., assignor to Monsanto Chemical Company, St. Louis, Mo., a corporation of Delaware No Drawing. Application December 4, 1940, Serial No. 368,515

10 Claims. (Cl. 260—23)

This invention relates to improved compositions of matter comprising polystyrene. More particularly, this invention relates to compositions having desirable electrical properties and improved heat stability comprising polystyrene and a chlorinated diphenyl.

Polystyrene is a particularly valuable material for use in the field of electrical insulation because of its remarkable electrical properties. However, for certain electrical insulation purposes, the tendency of polystyrene and polystyrene-containing compositions to soften at moderately raised temperatures is a disadvantage due to the danger that distortion is liable to occur under conditions of use, and much effort has been expended in attempting to overcome this defect.

It is an object of this invention to provide improved compositions comprising polystyrene. A further object is to increase the heat distortion temperature and lessen the plastic flow of compositions comprising polystyrene. Another object is to provide compositions comprising polystyrene that are suitable for electrical insulation and possess high heat distortion temperatures. A still further object is to provide electrical insulating materials comprising polystyrene which are non-inflammable and which possess high heat distortion temperatures. Another object of this invention is to provide insulating materials adaptable for use with radio frequency currents, which are non-inflammable and resistant to heat distortion. Other objects will become apparent hereinafter.

The present invention comprehends compositions comprising polystyrene and chlorinated diphenyls having heat distortion temperatures above that of polystyrene per se. According to one embodiment of the present invention, it has been found that the incorporation of completely or nearly completely chlorinated diphenyl in polystyrene produces compositions with distinctive and valuable properties. More particularly the present invention comprises the incorporation of chlorinated diphenyl having a chlorine content in excess of 69% with polystyrene to produce compositions having the desirable properties hereinafter described. It has been proposed heretofore that electrical insulation materials be prepared by mixing polystyrene and chlorinated diphenyls containing 54–69% chlorine. Such materials are rubbery in nature and are alleged to be employable as impregnants for fabrics. In fact, these materials become sufficiently fluid at 150° C. for such uses. Moreover, such compositions have a heat distortion value below that of polystyrene and, consequently, are not desirable for use as radio frequency current insulation where heat distortion is a factor. The products of the present invention are entirely different in their properties from these prior materials. Thus, the compositions of this invention do not become fluid at 150° C. and are not susceptible of being used as impregnants for fabrics at that temperature. Furthermore, the products of the present invention have heat distortion temperatures above that of polystyrene.

The following examples are illustrative embodiments of the present invention, but are not limitations thereof. The parts in these and subsequent examples are by weight. Two types of polystyrene were employed in these examples, one described as polystyrene "A" was suitably polymerized to such a degree that a 10% solution in toluene possessed a viscosity of substantially 200 centipoises at 25° C., the other described as polystyrene "B" was suitably polymerized to such a degree that a 10% solution in toluene possessed a viscosity of substantially 50 centipoises at 25° C.

EXAMPLE 1

|  | Parts |
|---|---|
| Polystyrene "A" | 50 |
| Decachlordiphenyl | 50 |

The two components of this composition were mixed together in a suitable manner, as for example, on mixing rolls operating at equal speeds, at a roll temperature of substantially 310° F. The resulting composition appeared to be a physical mixture of the polystyrene and the decachlordiphenyl rather than a solid solution of the decachlordiphenyl in the polystyrene. This material, after being comminuted in a suitable manner, was found to possess good molding characteristics and molded articles were readily prepared by both injection and compression molding processes. The remarkable electrical characteristics of this material are illustrated below in a chart showing certain electrical properties of a suitably molded article ¼ inch in thickness, prepared from the product of this example. The electrical tests were conducted at 300 kilocycles.

|  | Before water immersion | After 96 hours immersion in water at 25° C. |
|---|---|---|
| Power factor | Less than 0.05% | Less than 0.05%. |
| Dielectric constant | 2.57 | 2.60. |

The non-inflammability of the product of this example is indicated by the fact that a molded strip of this material, 5 inches long, 0.5 inch wide and 0.25 inch in thickness did not burn after removal from a gas flame to which it has been exposed for substantially 10 seconds.

The heat distortion temperature of the product of this example was found to be substantially 188° F. This value was determined on a molded bar 5 inches long with a ½ inch square cross section, according to the procedure described for the test entitled "Distortion under heat" on pages 250–251 of part III of the 1939 Book of A. S. T. M. Standards, published by the American Society for Testing Materials, 260 S. Broad St., Philadelphia, Pennsylvania.

The plastic flow of a molded bar of this composition, 5 inches long with a ½ inch square cross-section, was found to be substantially one-twentieth of that of a bar of polystyrene identical in size. The measurements were made at 167° F. under a 2.5 kilogram load applied to the center of the bar with the bar supported at both ends.

The following example is a variation of Example 1 and shows a composition that is advantageous for certain purposes.

EXAMPLE 2

| | Parts |
|---|---|
| Polystyrene "A" | 33 |
| Decachlordiphenyl | 33 |
| Powdered quartz | 33 |
| Butyl stearate | 1 |

The above ingredients were mixed together in the same manner as were the components in Example 1, the order of adding the materials to the rolls being successively, polystyrene, butyl stearate, decachlordiphenyl and quartz. The addition of the butyl stearate was for the purpose of enhancing the molding qualities of the product.

This product possessed properties similar to those of the product of Example 1. After being suitably comminuted, both compression and injection molded articles were readily prepared in the customary manner. The electrical properties of this composition, determined on a molded piece similar in size to that employed in Example 1, are shown in the table below. These tests as in Example 1, were made at 300 kilocycles.

| | Before water immersion | After 96 hours immersion in water at 25° C. |
|---|---|---|
| Power factor per cent | 0.135 | 2.15 |
| Dielectric constant | 2.50 | 2.99 |

The resistance to burning of the product of this example was similar to that of the product of Example 1. The heat distortion temperature of this product, determined in the same manner as in Example 1, was found to be substantially higher than that of the product of Example 1, a value of 196° F. being obtained.

The plastic flow of a molded bar of this composition, 5 inches long with a ½ inch square cross-section, was found to be substantially one hundredth of that of a bar of polystyrene identical in size. Both measurements were made at 167° F. under a 2.5 kilogram load applied to the center of the bar with the bar supported at both ends.

The outstanding properties of the products of this invention can be readily seen from the foregoing examples. The combination of remarkable electrical characteristics, non-inflammability and high heat distortion temperatures make these materials extremely valuable for electrical fixtures and other insulation purposes, especially in radio work where high frequency currents are employed. As examples of electrical fixtures and other equipment in which the products of the present invention are employable, are switch plates, coil forms, insulating beads, jacks, bushings, safety shields, dust protectors, stand-off insulators, panels, cable connectors, conduits, insulating caps, plugs and sockets of various types, microphone connectors, insulator tubes, receptacles, switches, etc. In particular, products made from the new compositions of this invention have been found to be superior to those made from ceramic and related types of insulating materials. Thus, in contrast to such prior materials, the products of this invention can be readily drilled, tapped, milled, or otherwise machined. Furthermore, said prior products tend to possess substantially poorer electrical properties after immersion in water whereas the preferred products of this invention possess substantially unchanged electrical properties after water immersion. However, while the products of this invention appear likely to find their greatest use in electrical insulation, their non-inflammability and high heat distortion temperatures make advantageous their use for many purposes as is obvious to those skilled in the art.

A comparison of the heat distortion temperatures of several embodiments of this invention with certain prior polystyrene-containing materials is given in the following table.

Table 1

| Composition | Heat distortion temperature |
|---|---|
| | °F. |
| Polystyrene "B" | 167 |
| Polystyrene "A" | 170 |
| Polystyrene "A"—100 parts<br>Decachlordiphenyl—30 parts | 182 |
| Polystyrene "A"—100 parts<br>Decachlordiphenyl—60 parts | 185 |
| Polystyrene "A"—100 parts<br>Decachlordiphenyl—100 parts | 188 |
| Polystyrene "A"—100 parts<br>Chlorinated diphenyl (contains 68% chlorine)—100 parts | 115 |

Where the foregoing compositions comprised mixtures, these mixtures were prepared by the method employed in Example 1.

It can readily be seen from the foregoing table that the heat distortion temperature of polystyrene is affected only very slightly by a considerable variation in the degree of polymerization of polystyrene. Furthermore, it can be seen that the addition of chlorinated diphenyls of this invention to polystyrene have a directly opposite effect on the heat distortion temperatures of the resulting compositions to that imparted by chlorinated diphenyls containing lesser amounts of chlorine.

Another indication of the high heat resistance of polystyrene compositions containing chlorinated diphenyls of this invention in comparison with the poor heat resistance of polystyrene compositions containing chlorinated diphenyls with a lower chlorine content is given by the results of a comparative impregnation test carried out on the compositions listed in the following table.

Table 2

| Batch No. | Composition |
|---|---|
| 1 | Polystyrene "B." |
| 2 | Polystyrene "A." |
| 3 | Polystyrene "A"—100 parts. Chlorinated diphenyl (contains 54% chlorine)—100 parts. |
| 4 | Polystyrene "A"—100 parts. Chlorinated diphenyl (contains 68% chlorine)—100 parts. |
| 5 | Polystyrene "A"—100 parts. Decachlordiphenyl—100 parts. |

Where the foregoing compositions comprised mixtures, these mixtures were prepared by the method employed in Example 1.

Granulated material prepared from each of the above compositions was placed in separate test tubes that each contained a small roll of cotton cloth. The several test tubes and their contents were placed in an oil bath at 150° C. for 18 hours and thereafter removed and examined. It was found that batches 3 and 4 had melted and impregnated the cloth whereas the remaining batches had shown only slight signs of softening, had not melted and had not impregnated the cloth.

There are numerous variables that may be introduced without departing from the scope of the present invention. Thus, this invention is not limited to polystyrene of any particular degree of polymerization, although it is contemplated that the two types of polystyrene hereinbefore shown will generally represent extremes in the degree of polymerization. The method of incorporating the chlorinated diphenyl in the polystyrene is not critical and other types of mixing equipment and other mixing temperatures may be employed than those given in the examples. Quartz has been shown to be an advantageous added material if a still higher heat distortion temperature is desired. Other materials of a mineral nature, as for example mica, may be added if found advantageous. In Example 2, the addition of butyl stearate, as a lubricant, is shown. The use of a lubricant is optional, and the use of this or any other lubricant, such as zinc stearate, aluminum stearate, etc., depends upon the particular characteristics desired in the product. Other modifying, filling or coloring materials may be added if found advantageous.

Generally, the amount of a chlorinated diphenyl of this invention that is incorporated with polystyrene varies from 30 parts to 100 or 120 parts, or even more, per 100 parts of polystyrene, although there may be some sacrifice of strength and molding qualities of the product when the higher proportions of the chlorinated diphenyl are employed. While proportions of chlorinated diphenyl to polystyrene lower than 30 parts per 100 parts of polystyrene may be employed, such compositions become somewhat inflammable and approach polystyrene in their heat distortion temperatures. Substantially equal parts of a chlorinated diphenyl of this invention and polystyrene produce a composition that is highly advantageous for many purposes.

For purposes where the addition of quartz is advantageous to further raise the heat distortion temperature, this material may be added in any suitable proportion although it is generally not advantageous to increase the proportion substantially higher than that given in Example 2, in compositions containing substantially equal parts of polystyrene and a chlorinated diphenyl of this invention.

The compositions of this invention may be formed into a desired shape by any of the customary methods employed for plastic materials. Thus, in addition to shaping these compositions by injection or compression molding methods, they may be continuously extruded into sheets, rods or tubes of either regular or irregular cross-sectional shape. Other shaping methods that can be employed comprise forming into sheets by well-known calendering methods or by sheeting pre-formed cakes in the customary manner.

This invention is limited solely by the claims attached hereto.

What is claimed is:

1. A new composition of matter comprising a mixture of polystyrene and a substantially equal amount by weight of decachloridiphenyl, and characterized by having a heat distortion temperature above that of the polystyrene.

2. A new composition of matter comprising a mixture of substantially 100 parts of polystyrene, substantially 100 parts of decachlordiphenyl and substantially 2 parts of butyl stearate, and characterized by having a heat distortion temperature above that of the polystyrene.

3. A new composition of matter comprising a mixture of substantially 100 parts by weight of polystyrene and from about 30 parts by weight to about 100 parts by weight of decachlordiphenyl, and characterized by having a heat distortion temperature above that of the polystyrene.

4. A new composition of matter comprising a mixture of polystyrene, decachlordiphenyl and quartz, and characterized by having a heat distortion temperature above that of the polystyrene.

5. A new composition of matter comprising a mixture of substantially equal amounts by weight of polystyrene, decachlordiphenyl and quartz, and characterized by having a heat distortion temperature above that of the polystyrene.

6. A molding composition comprising a mixture of polystyrene and decachlordiphenyl, and characterized by having a heat distortion temperature above that of the polystyrene.

7. A molded article possessing properties suitable for milling, drilling, tapping, and other machining operations, comprising a mixture of polystyrene and decachlordiphenyl united under heat and pressure into the desired form and characterized by having a heat distortion temperature above that of the polystyrene.

8. A molding composition comprising a mixture of substantially 100 parts by weight of polystyrene and from about 30 parts by weight to about 120 parts by weight of decachlordiphenyl, said mixture characterized by a heat distortion temperature above that of the polystyrene.

9. A molding composition comprising a mixture of substantially 100 parts by weight of polystyrene and from about 30 parts by weight to about 60 parts by weight of decachlordiphenyl, said mixture characterized by a heat distortion temperature above that of the polystyrene.

10. A molding composition comprising a mixture of substantially 100 parts by weight of polystyrene and from about 30 parts by weight to about 120 parts by weight of a chlorinated diphenyl consisting essentially of decachlordiphenyl, said mixture characterized by a heat distortion temperature above that of the polystyrene.

RALPH F. HAYES.